(12) United States Patent
de la Fuente

(10) Patent No.: US 8,939,793 B1
(45) Date of Patent: Jan. 27, 2015

(54) THROUGH-MOUNTED DEVICE CONNECTOR

(71) Applicant: Amazon Technologies, Inc., Reno, NV (US)

(72) Inventor: Valentin Shaun de la Fuente, San Jose, CA (US)

(73) Assignee: Amazon Technologies, Inc., Reno, NV (US)

( * ) Notice: Subject to any disclaimer, the term of this patent is extended or adjusted under 35 U.S.C. 154(b) by 96 days.

(21) Appl. No.: 13/870,083

(22) Filed: Apr. 25, 2013

(51) Int. Cl.
*H01R 13/73* (2006.01)
*H01R 24/58* (2011.01)
*H01R 43/00* (2006.01)

(52) U.S. Cl.
CPC .............. *H01R 24/58* (2013.01); *H01R 43/00* (2013.01)
USPC .............. 439/573; 439/668; 29/842; 29/844; 29/874; 29/876; 29/884

(58) Field of Classification Search
USPC ............ 29/842, 844, 874, 876, 884; 439/573, 439/564, 668
See application file for complete search history.

(56) References Cited

U.S. PATENT DOCUMENTS

| 5,655,931 | A * | 8/1997 | Perugini ................ 439/573 |
| 6,733,335 | B2 * | 5/2004 | Wu .................. 439/570 |
| 6,824,399 | B2 * | 11/2004 | Smith et al. ............... 439/82 |
| 6,827,607 | B2 * | 12/2004 | Fujita et al. ............ 439/573 |
| 7,934,951 | B2 * | 5/2011 | Blair et al. .............. 439/573 |
| 2006/0205271 | A1 * | 9/2006 | Hsu ................... 439/573 |
| 2007/0004275 | A1 * | 1/2007 | Li et al. ............. 439/573 |
| 2008/0169119 | A1 * | 7/2008 | Palmeri et al. ........... 174/250 |
| 2009/0227128 | A1 * | 9/2009 | Carlavan et al. .......... 439/92 |
| 2010/0267284 | A1 * | 10/2010 | Krawinkel ............ 439/625 |

* cited by examiner

*Primary Examiner* — Gary Paumen
(74) *Attorney, Agent, or Firm* — Lowenstein Sandler LLP

(57) ABSTRACT

An apparatus having a connector housing having an interior socket to receive a connector plug. The connector housing including a mounting hole through the interior socket, the mounting hole comprising a top opening in a first side of the interior socket and a bottom opening in a second side of the interior socket, the first side opposite the second side. A central axis of the mounting hole is oriented perpendicular to a central axis of the interior socket and the central axis of the mounting hole intersects the central axis of the interior socket, the mounting hole to allow a mounting element to pass through the interior socket along the central axis of the mounting hole.

20 Claims, 8 Drawing Sheets

THROUGH-MOUNTED DEVICE CONNECTOR

BACKGROUND

A large and growing population of users enjoy entertainment through the consumption of digital media items, such as music, movies, images, electronic books, and so on. Users employ various electronic devices to consume such media items. Among these electronic devices are electronic book readers, cellular telephones, personal digital assistants (PDAs), portable media players, tablet computers, netbooks, and the like.

These electronic devices often use include connectors used to couple peripheral components to the electronic device. For example, the connector may be a socket or jack designed to receive a connector plug for the peripheral device, such as for headphones, earphones, external speakers, microphones, external display devices, etc. In some cases, the connectors have a fixed size, including a section designed for mounting the connector to the electronic device, and require a certain amount of space in order to fit and function properly. If the space within the device is not large enough to accommodate certain connectors, those connectors may not be used. This may result in the manufacturer resorting to the use of more expensive or less readily available connectors, or increasing the size of the electronic device.

BRIEF DESCRIPTION OF THE DRAWINGS

Embodiments of the present invention will be understood more fully from the detailed description given below and from the accompanying drawings, which, however, should not be taken to limit the present invention to the specific embodiments, but are for explanation and understanding only.

DETAILED DESCRIPTION

Embodiments of an apparatus are described for a device connector mounting solution. In one embodiment, connector housing is to be attached to a device housing, or other support structure. The connector housing may be part of an audio connector, such as a headphone jack, into which an external connector plug may be inserted to connect a peripheral device (e.g., headphone, speakers). The mounting solution described herein includes a mounting hole in the connector housing that passes through a connector plug receiving socket. The connector plug receiving socket is the cavity within the connector housing into which the connector plug is inserted during normal operation. The connector plug receiving socket may include one or more electrical contacts disposed within the socket to make contact with an inserted connector plug. The contacts are used to pass electrical signals (e.g., audio signals) between the connector and the peripheral device.

In one embodiment, a mounting element, such as a screw is passed through the mounting hole in the connector housing, thereby passing through the connector plug receiving socket, and inserted into a countersink at the opposite end of the mounting hole to secure the connector housing to the device housing. The countersink may allow the screw to sit flush with or below the interior surface of the connector plug receiving socket so that the connector plug may be inserted into the connector housing without contacting the screw.

By having the mounting hole pass through the main body of connector housing (e.g., through connector plug receiving socket), the footprint of the connector housing may be reduced. In one embodiment, a separate mounting component attached to the side or end of the connector housing, where the screw would normally pass to secure the connector housing to the device housing is not needed. This can reduce the overall size of the connector housing, leaving extra space within the device housing for additional components or allowing the overall size of the device housing to be reduced. In addition, the screw is secured directly in-line with the center of the connector housing, which is where any force caused by the insertion of the connector plug would be applied. This can decrease the moment of force of the connector housing as compared to the force on a screw that is secured off-axis from the center of the connector housing.

Figure 1:
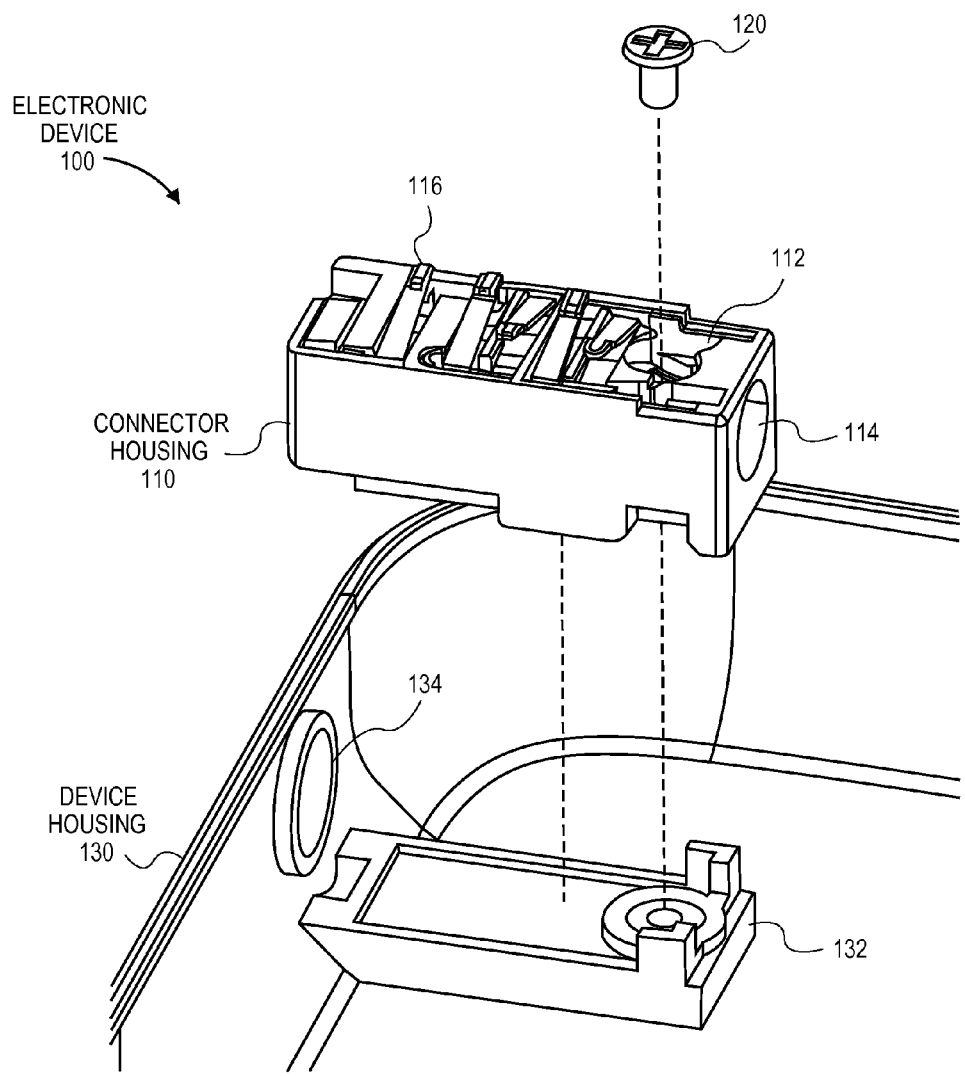
FIG. 1 is a block diagram illustrating an exploded view of an electronic device with a connector housing, according to an embodiment.

FIG. 1 is a block diagram illustrating an exploded view of an electronic device 100 with a connector housing 110, according to an embodiment. In one embodiment, the connector housing 110 includes a mounting hole 112 through the connector housing 110. The mounting hole 112 allows a screw 120, or other mounting element, to pass through connector housing 110 to secure connector housing 110 to a mounting bracket 132 on an external device housing 130 of electronic device 100. In one embodiment, mounting bracket 132 is not used and connector housing 110 is mounted directly to external device housing 130.

In one embodiment, the mounting hole 112 through connector housing 110 passes through a connector plug receiving socket 114 in the interior of the connector housing 110. The connector plug receiving socket 114 may be a cavity within connector housing 110 designed to receive a connector plug from an external peripheral component through an opening 134 in the edge of external device housing 130. The connector plug may be attached to a peripheral component such as headphones, earphones, an external speaker, a microphone, an external display device, or other component. The connector plug may be designed to pass electrical signals between the peripheral component and one or more contacts within the connector plug receiving socket 114. The electrical signals may include, for example, audio signals, video signals, or other electrical signals.

In one embodiment, the contacts within the connector plug receiving socket 114 are attached to contact leads 116 on the exterior of connector housing 110. The contact leads 116 may be connected to other components within electronic device 100 in order to pass electrical signals between the contacts within the connector plug receiving socket 114 and the other components. The contact leads 116 may be connected to the other components using for example, wired connections, conductive traces, a flexible connector, a bus connector, or other connection means.

In one embodiment, screw 120 passes through the mounting hole 112 (thereby passing through connector plug receiving socket 114) to secure connector housing 110 to the mounting bracket 132 or external device housing 130. This eliminates the need for a separate mounting component, which may be attached to a side or end of connector housing 110, through which the screw 120 would normally pass to secure connector housing 110 to device housing 130. This can reduce the overall size of connector housing 110, leaving extra space within device housing 130 for additional components or allowing the overall size of electronic device 100 to be reduced.

Figure 2:
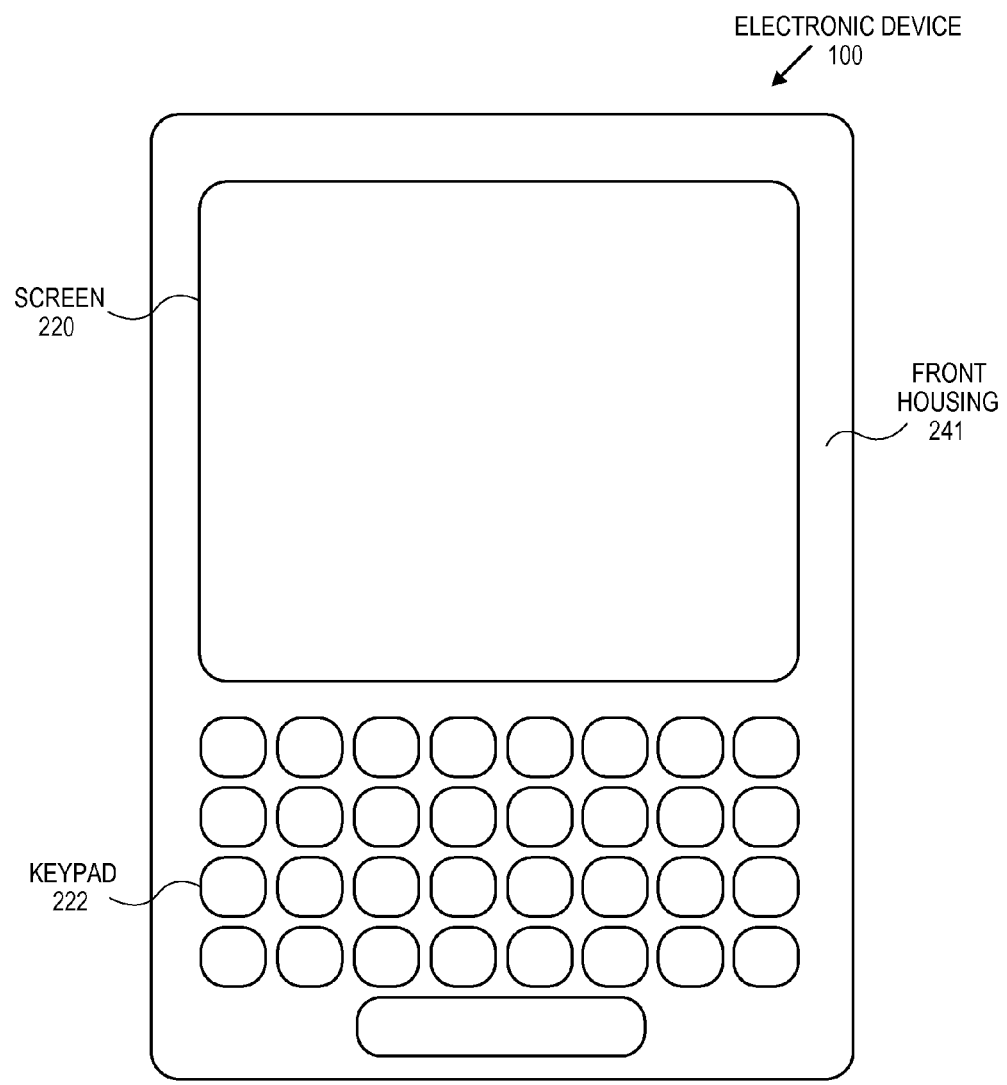
FIG. 2 is a block diagram illustrating a front view of an electronic device, according to an embodiment.
Figure 3:
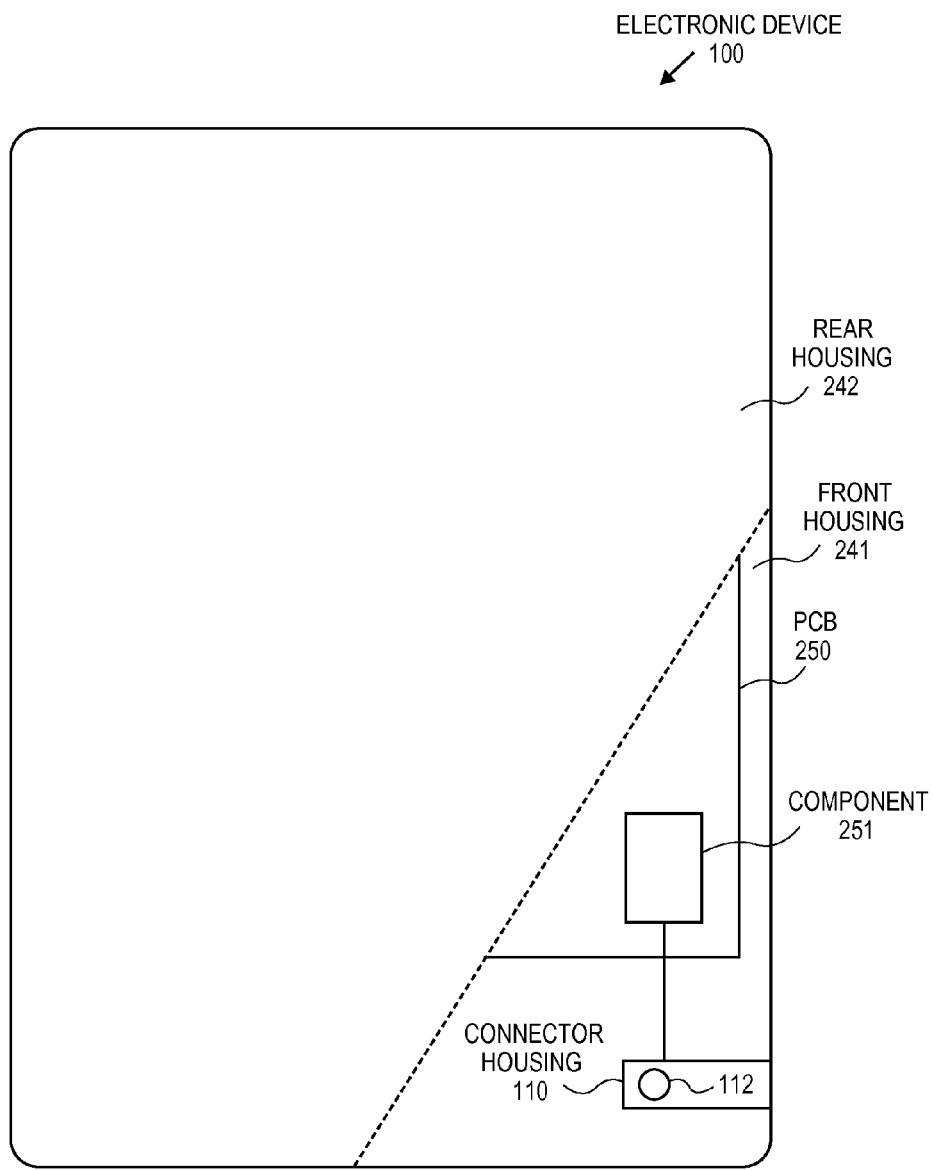
FIG. 3 is a block diagram illustrating a partially cutaway back view of an electronic device, according to an embodiment.

FIG. 2 illustrates a front view of an embodiment of an electronic device 100. FIG. 3 illustrates a partially cutaway back view of the electronic device 100. The electronic device 100 may include, for example, an electronic book reader, a cellular telephone, a personal digital assistant (PDAs), a portable media player, a tablet computer, a netbook, or any portable, compact electronic device.

The electronic device 100 may include a screen 220 which can display text, images, or other media. In particular, the screen 220 may comprise a liquid crystal display (LCD), an electrophoretic ink (E ink) screen, an interferometric modulator (IMod) screen, or any another type of display. The screen 220 may include a plurality of pixels arranged in a grid having parameters that are individually configurable by the electronic device. For example, the electronic device 100 may be configured to adjust the color and/or brightness of individual pixels so as to display an image, text, or other media.

The electronic device 100 may include a front housing 241 which at least partially surrounds and protects the internal components of the electronic device 100, such as those described below with respect to FIG. 8. The front housing 241 may include openings through which output devices, such as the screen 220 can transmit information to a user and through which input devices, such as the keypad 222, can receive information from a user. In one embodiment, the front housing 241 is composed of plastic. In other embodiments, the front housing 241 is composed of other materials.

The electronic device 200 includes a rear housing 242 opposite the front housing 241 which partially surrounds and protects the internal components of the electronic device 200. In one embodiment, the rear housing 242 is coupled to the front housing 241 to create a complete housing for the electronic device 200. Although the front housing 241 and rear housing 242 are described as separate components, it is to be appreciated that the housing may be formed as a single component or using more than two components. The external device housing 130 shown in FIG. 1 may be representative of either front housing 241 or rear housing 242.

In one embodiment, the housing surrounds support structure 250, such as a printed circuit board (PCB), of the electronic device 100. The PCB 250 may have one or more electrical components 251 attached thereto, including, for example, a signal generation device, a processing device, a storage device, or some other component. In one embodiment, the components 251 on PCB 250 may be connected to connector housing 110 to transmit signals between component 251 and connector housing 110. In one embodiment, the connector housing may be mounted to PCB 250. The connector housing may include a mounting hole 112 that passes through one end of the connector housing that is opposite an end of the connector housing closest to an edge of the external device housing 241. By having the mounting hole 112 pass through connector housing 110 (thereby passing through the connector plug receiving socket), the overall size of the connector housing 110 is reduced. In particular, the footprint of connector housing 110 (i.e., the area on external housing 241 that is covered by connector housing 110) is reduced.

Figure 4:
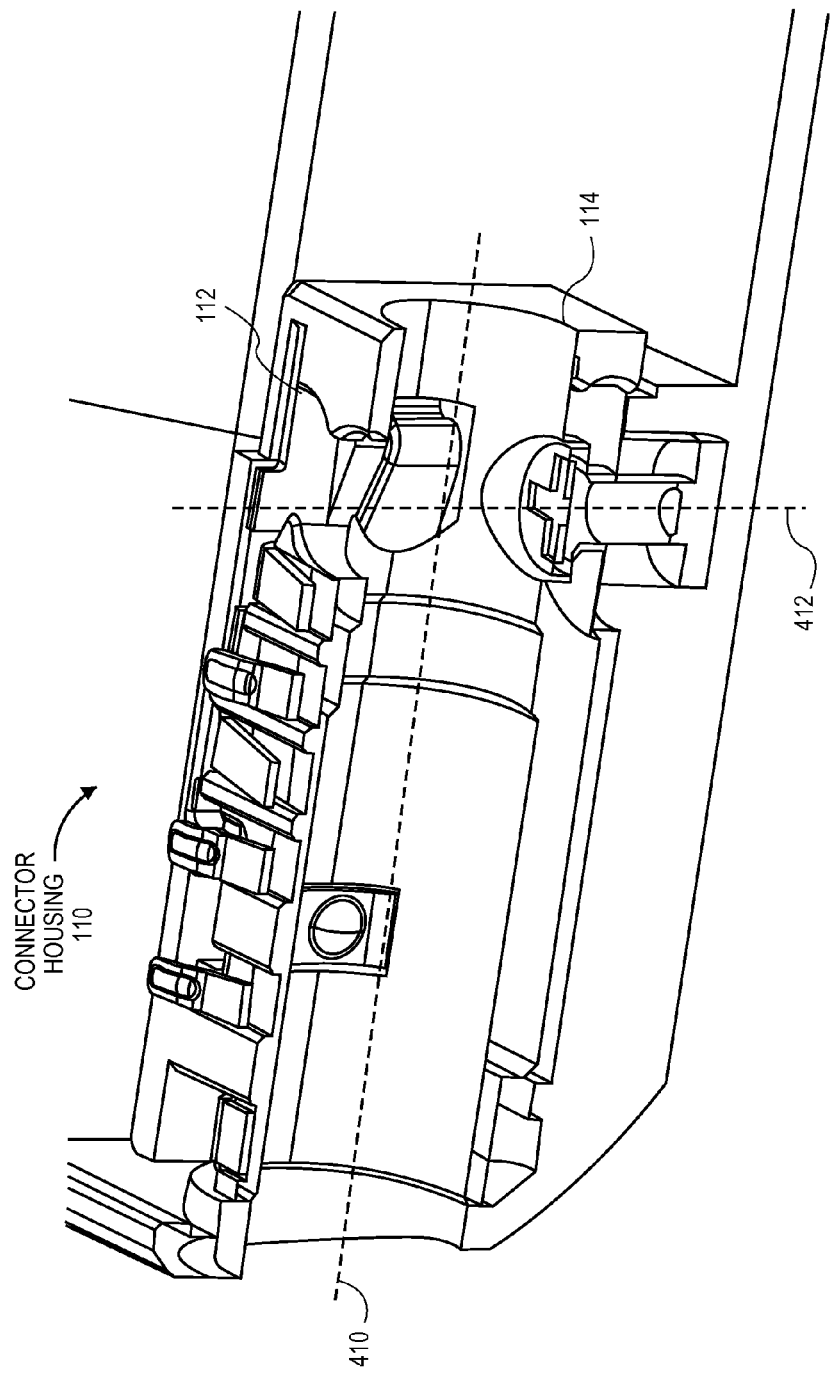
FIG. 4 is a block diagram illustrating a cross-sectional view of a connector housing, according to an embodiment.

FIG. 4 is a block diagram illustrating a cross-sectional view of a connector housing, according to an embodiment. In one embodiment, connector housing 110 includes mounting hole 112 and connector plug receiving socket 114. In one embodiment, connector plug receiving socket 114 is a substantially cylindrical void running down the length of connector housing 110. The connector plug receiving socket 114 may be oriented around a central axis 410. Central axis 410 is an imaginary line running through the center of connector plug receiving socket 114. In one embodiment, central axis 410 may also be oriented down the center of connector housing 110. In other embodiments, central axis 410 may be offset from the lengthwise center of connector housing 110. In some embodiments, connector plug receiving socket 114 may not be a perfect cylinder, as it may include cutouts for electrical contacts, a countersink to receive a mounting element, may taper in diameter towards one end, or may otherwise be modified to accommodate a connector plug. In other embodiments, connector plug receiving socket 114 may have some other shape besides a cylinder.

In one embodiment, mounting hole 112 passes through connector housing 110 and through connector plug receiving socket 114. In one embodiment, mounting hole 112 is a substantially cylindrical void running down a width or height of connector housing 110. The mounting hole 112 may be oriented around a central axis 412. Central axis 412 is an imaginary line running through the center of mounting hole 112. In one embodiment, the central axis 412 of mounting hole 112 is oriented perpendicular to the central axis 410 of connector plug receiving socket 114. That is a 90 degree angle may be formed between central axis 410 and central axis 412. In one embodiment, central axis 412 may intersect the central axis 410. Since the central axes are imaginary lines, there is no actual physical intersection, but the intersection ensures that mounting hole 112 is vertically aligned with the horizontal center of connector plug receiving socket 114. Thus, when a mounting element (such as screw 120) is inserted through mounting hole 112 to secure connector housing 110 to the device housing, a moment of force of the connector housing 110 about the central axis 410 of connector plug receiving socket 114 is reduced compared to a mounting element that is attached to a separate mounting component off the side of connector housing 110. With this reduction in force, the connector housing 110 is less likely to be loosened or separated from the device housing during operation.

In other embodiments, the central axis 412 of mounting hole 112 may not intersect central axis 410 of connector plug receiving socket 114. The central axis 412 may be offset to one side or the other of central axis 410, while still passing through connector plug receiving socket 114. In some embodiments, mounting hole 112 may not be a perfect cylinder, as it may include cutouts (e.g. where it intersects connector plug receiving socket 114), or may otherwise be modified to accommodate a mounting element. In other embodiments, mounting hole 112 may have some other shape besides a cylinder.

Figure 5:
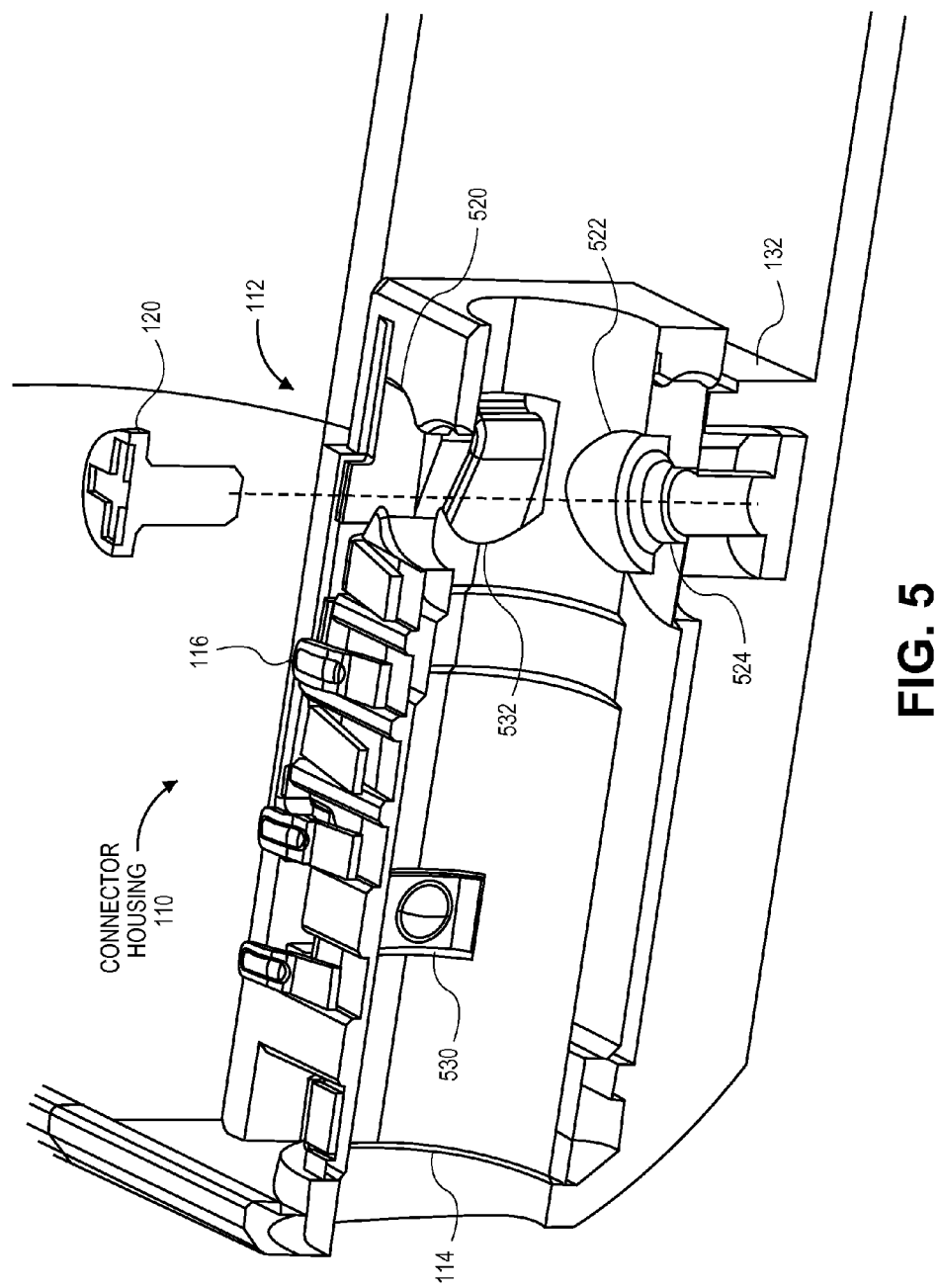
FIG. 5 is a block diagram illustrating a cross-sectional view of a connector housing, according to an embodiment.

FIG. 5 is a block diagram illustrating a cross-sectional view of a connector housing, according to an embodiment. In one embodiment, connector housing 110 includes mounting hole 112 and connector plug receiving socket 114. Connector plug receiving socket 114 may include a number of electrical contacts 530, 532 disposed within connector plug receiving socket 114. That is, the contacts 530, 532 may be located on an interior surface of the connector plug receiving socket 114 with the connection points oriented towards the center. The contacts 530, 532 may be fixed contacts or may be spring loaded contacts in order to form a secure connection with a connector plug inserted into connector plug receiving socket 114. The connector plug may be designed to pass electrical signals between a peripheral component the contacts 530, 532 within the connector plug receiving socket 114. The electrical signals may include, for example, audio signals, video signals, or other electrical signals. In one embodiment, the connector plug may be segmented such as a TRS (tip, ring, sleeve) or a TRRS (tip, ring, ring, sleeve) connector, so that different electronic signals may be transmitted from each of contacts 530 and 532 (e.g., a left speaker signal and a right speaker signal). The contacts 530, 532 may be located at specific locations within connector plug receiving socket 114 so as to contact an intended segment (e.g., tip, ring or sleeve) of the connector plug. In one embodiment, the contacts 530, 532 within the connector plug receiving socket 114 are attached to contact leads 116 on the exterior of connector housing 110. The contact leads 116 may be connected to other components within electronic device 100 in order to pass electrical signals between the contacts 530, 532 and the other components.

In one embodiment, the mounting hole 112 includes a first opening 520 in a first side of the connector plug receiving socket 114 (e.g., a top side) and a second opening 522 in a second side of the connector plug receiving socket 114 (e.g., a bottom side). In other embodiments, the first opening 520 and the second opening 522 may be on other sides of the connector plug receiving socket 114 (e.g., a left side and a right side respectively). In one embodiment, the first opening 520 and the second opening 522 may be substantially circular in shape, or may have the same shape as the mounting element 120 to be used to secure connector housing 110 to the device housing.

In one embodiment, the second opening 522 opens into a countersink 524 in connector housing 110 and mounting bracket 132. The countersink 524 is a hole cut into the interior surface of connector plug receiving socket 114 to allow the head of a countersunk bolt or screw (e.g., mounting element 120), when placed in the hole, to sit flush with or below the surface of the surrounding material. In one embodiment, the countersink 524 is a conical hole having an angle chamfer (e.g., between 60 and 120 degrees from vertical). In other embodiments, the countersink 524 may be referred to as a counterbore when there is a flat bottomed hole without chamfered edges. In one embodiment, mounting element 120 is inserted through mounting hole 520, thereby passing through connector plug receiving socket 114 and inserted into countersink 524. The threads of mounting element 120 may engage the threads on a hole in mounting bracket 132 (or alternatively in external device housing 130. When fully engaged, the top surface of mounting element 120 may sit within countersink 524 such that it is flush with or below the interior surface of connector plug receiving socket 114. This may allow a connector plug to be inserted into connector plug receiving socket 114 without contacting mounting element 120. In one embodiment, the mounting element may include an insulating layer (e.g., made from a non-conductive material such as plastic) on the top surface. The top surface of the mounting element 120 may be a surface of the mounting element that is exposed to connector plug receiving socket 114 when the mounting element is inserted into countersink 524 (e.g., the top of the screw head). The insulating layer may further serve to prevent any contact between the mounting element 120 and an inserted connector plug.

Figure 6:
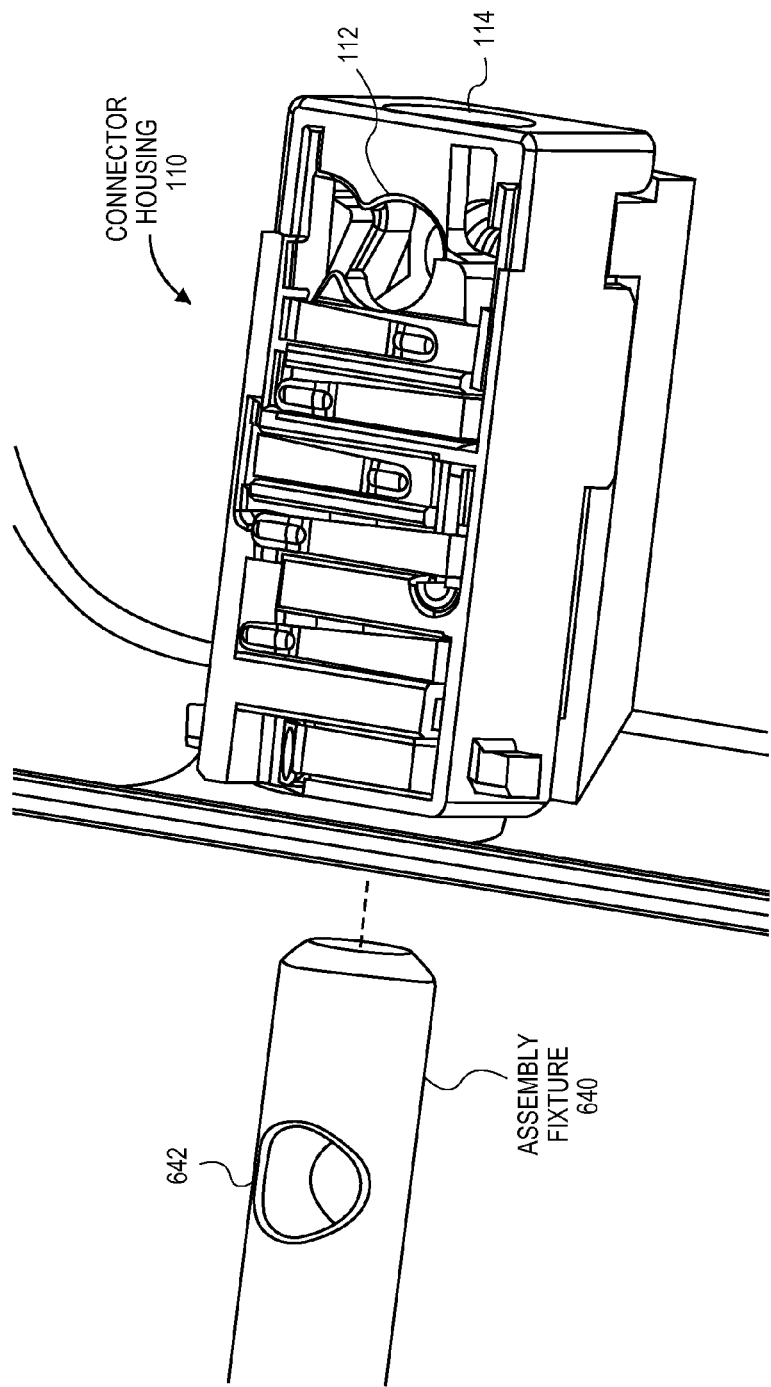
FIG. 6 is a block diagram illustrating an assembly fixture for use in securing a connector housing to an electronic device.

FIG. 6 is a block diagram illustrating an assembly fixture for use in securing a connector housing to an electronic device. In one embodiment, the assembly fixture 640 is inserted into the connector plug receiving socket 114 of connector housing 110 when the connector housing 110 is secured to the device housing. In one embodiment, the assembly fixture 640 is substantially cylindrical in shape. In other embodiments, assembly fixture 640 has some other shape or is substantially the same shape as connector plug receiving socket 114. The assembly fixture 640, when inserted, may protect the contacts within connector plug receiving socket 114 from being damaged by the mounting element which is inserted through mounting hole 112 to secure connector housing 110 to the device housing.

In one embodiment, assembly fixture 640 includes a through hole 642. In one embodiment, the through hole 642 may be substantially cylindrical in shape. In other embodiments, through hole 642 has some other shape or is substantially the same shape as mounting hole 112. The through hole 642 may be oriented perpendicular to the length of the cylindrical assembly fixture 640. In this manner, when assembly fixture 640 is inserted into connector plug receiving socket 114, through hole 642 may align with mounting hole 112 to provide a clear path through connector housing 110 for the mounting element to pass. In one embodiment, an end of assembly fixture 640 that is inserted into connector housing 110 may have a chamfered edge to prevent damage to connector plug receiving socket 114 upon insertion.

Figure 7:
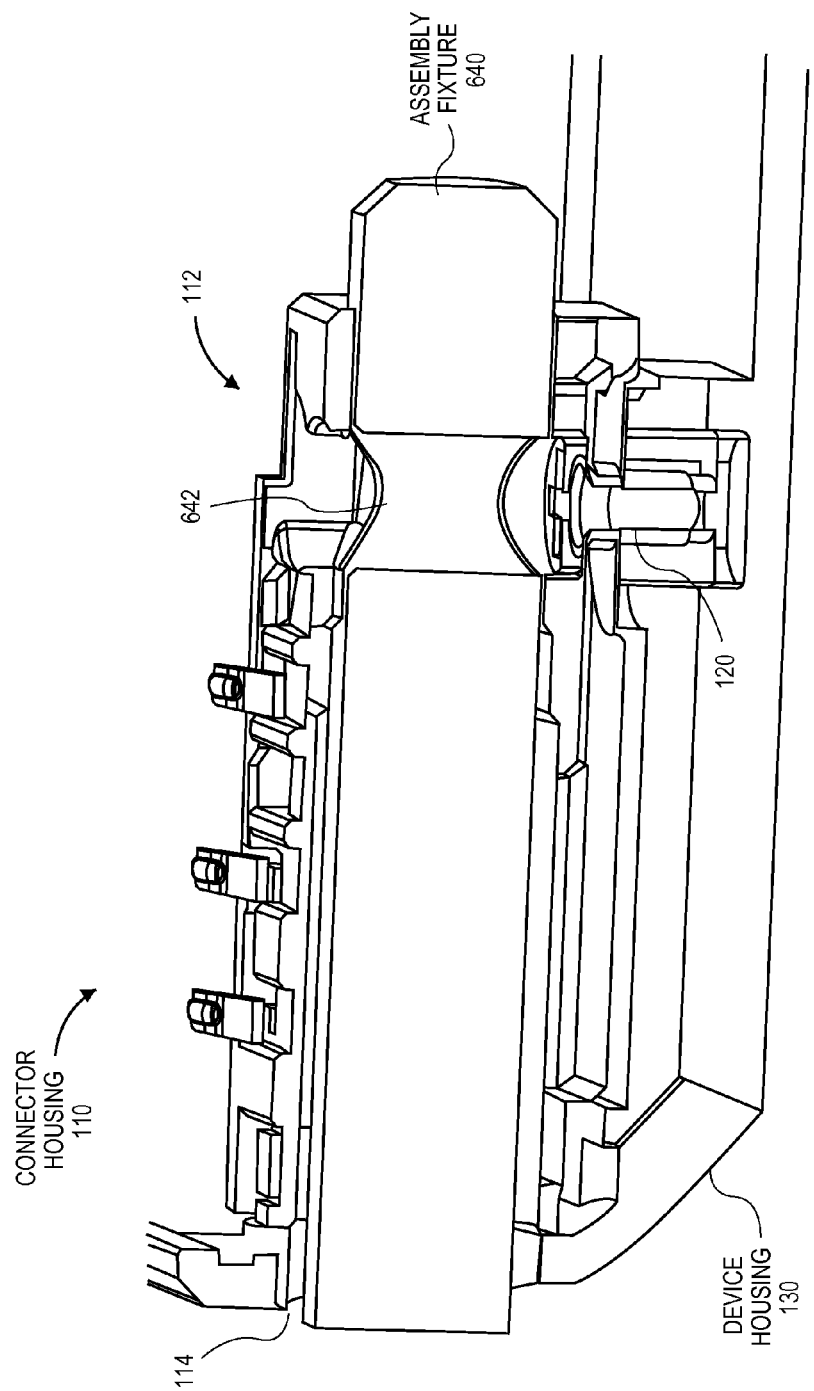
FIG. 7 is a block diagram illustrating a cross-sectional view of a connector housing with an inserted assembly fixture, according to an embodiment.

FIG. 7 is a block diagram illustrating a cross-sectional view of a connector housing with an inserted assembly fixture, according to an embodiment. In one embodiment, assembly fixture 640 is inserted into connector plug receiving socket 114 of connector housing 110 during an assembly process. The assembly process may be a process during which various components of electronic device are assembled, including, the securing of connector housing 110 to device housing 130. In one embodiment, assembly fixture 640 is inserted into connector plug receiving socket 114 so that through hole 642 is aligned with mounting hole 112 in connector housing 110. Once through hole 642 is aligned with mounting hole 112, a mounting element 120 (e.g., a screw) can be inserted through mounting hole 112, passing through through hole 642, and attached to device housing 130. Parts of mounting element 120 overhang connector housing 110 in order to secure connector housing 110 to device housing 130. As mounting element 120 passes through through hole 642, the electrical contacts within connector plug receiving socket 114 are protected from damage. In one embodiment, assembly fixture 640 presses certain contacts out of the way, so that they are not contacted or damaged by mounting element 120. In one embodiment, once mounting element 120 is used to secure connector housing 110 to device housing 130, assembly fixture 640 is removed from connector plug receiving socket 114. This allows for the insertion of a connector plug during normal operation.

Figure 8:
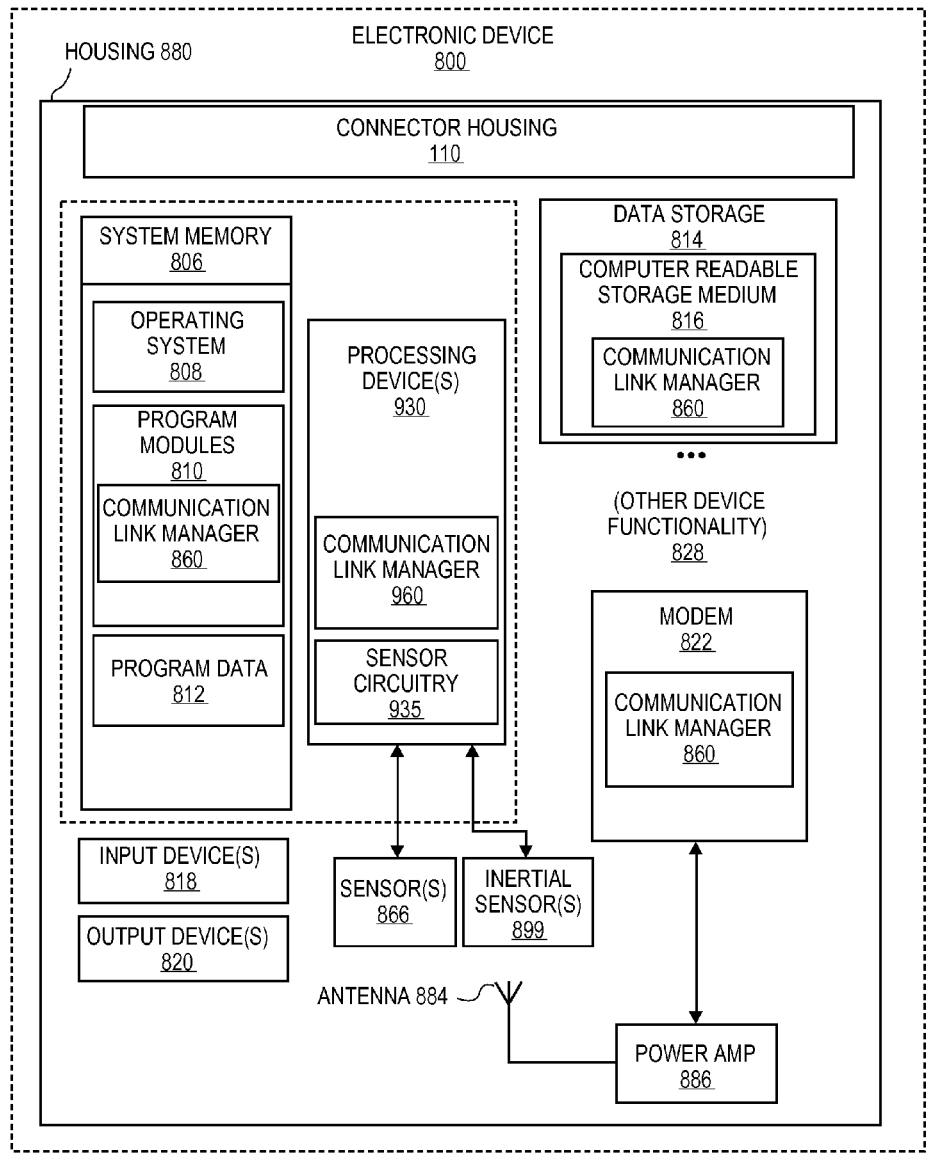
FIG. 8 is a block diagram illustrating an exemplary user device, according to an embodiment.

FIG. 8 illustrates a functional block diagram of an embodiment of an electronic device. The electronic device 800 may correspond to the electronic device 100 as shown in FIGS. 1-3 and may be any type of computing device such as an electronic book reader, a PDA, a mobile phone, a laptop computer, a portable media player, a tablet computer, a smart phone, a camera, a video camera, a netbook, a desktop computer, a gaming console, a digital video disc (DVD) player, a computing pad, a media center, and the like.

The electronic device 800 includes one or more processing devices 830, such as one or more central processing units (CPUs), microcontrollers, field programmable gate arrays, or other types of processing devices. The electronic device 800 also includes system memory 806, which may correspond to any combination of volatile and/or non-volatile storage mechanisms. The system memory 806 may include one or more of read-only memory (ROM), flash memory, dynamic random access memory (DRAM) such as synchronous DRAM (SDRAM)), and static random access memory (SRAM)). The system memory 806 stores information which provides an operating system component 808, various program modules 810 such as communication link manager 860, program data 812, and/or other components. The electronic device 800 performs functions by using the processing device(s) 830 to execute instructions provided by the system memory 806.

The electronic device 800 also includes a data storage device 814 that may be composed of one or more types of removable storage and/or one or more types of non-removable storage. The data storage device 814 includes a computer-readable storage medium 816 on which is stored one or more sets of instructions embodying any one or more of the methodologies or functions described herein. As shown, instructions for the communication link manager 860 may reside, completely or at least partially, within the computer readable storage medium 816, system memory 806 and/or within the processing device(s) 830 during execution thereof by the electronic device 800, the system memory 806 and the processing device(s) 830 also constituting computer-readable media. The electronic device 800 may also include one or more input devices 818 (keyboard, mouse device, specialized selection keys, etc.) and one or more output devices 820 (displays, printers, audio output mechanisms, etc.). In one embodiment, the input devices 818 and the output devices 820 may be combined into a single device (e.g., a touch screen).

The electronic device 800 further includes a wireless modem 822 to allow the electronic device 800 to wirelessly communicate with other computing devices. The wireless modem 822 allows the electronic device 800 to handle both voice and non-voice communications (such as communications for text messages, multimedia messages, media downloads, web browsing, etc.). The wireless modem 822 may also allow the electronic device 800 to handle other signaling data to facilitate communication of the voice and non-voice data between the electronic device 800 and other devices. The wireless modem 822 may provide network connectivity using any type of mobile network technology including, for example, cellular digital packet data (CDPD), general packet radio service (GPRS), enhanced data rates for global evolution (EDGE), universal mobile telecommunications system (UMTS), 1 times radio transmission technology (1×RTT), evaluation data optimized (EVDO), high-speed down-link packet access (HSDPA), WiFi, HSPA+, WiMAX, Long Term Evolution (LTE) and LTE Advanced (sometimes generally referred to as 4G), etc. In one embodiment, the wireless modem includes the communication link manager 860 in addition to, or instead of, the communication link manager 860 being included in the computer readable storage medium 816, system memory 806 and/or processing device(s) 830. The communication link manager 860 may be implemented as hardware, firmware and/or software of the wireless modem 822. It should be noted that the modem 822 may include a processing component that performs various operations to handle both voice and non-voice communications. This processing component can execute the communication link manager 860. Alternatively, the communication link manager 860 can be executed by a processing component of the electronic device, such as the processing device 830.

The wireless modem 822 may generate signals and send these signals to power amplifier (amp) 880 for amplification, after which they are wirelessly transmitted via antenna 884. The antenna 884 may be directional, omni-directional or non-directional antennas. In addition to sending data, the antenna 884 can be deployed to receive data, which is sent to wireless modem 822 and transferred to processing device(s) 830. In one embodiment, the antenna 884 may be used to form communication links between the electronic device 800 and a base station (e.g., a NodeB or a cell tower).

The processing device(s) 830 and the modem 822 may be a general-purpose processing devices such as a microprocessor, central processing unit, or the like. More particularly, the processing device(s) 830 and the modem 822 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device(s) 830 and the modem 822 may also be one or more special-purpose processing devices such as an application specific integrated circuit (ASIC), a field programmable gate array (FPGA), a digital signal processor (DSP), network processor, or the like.

In one embodiment, electronic device 800 includes one or more sensors 866 such as a physical contact sensor or close proximity sensors. The sensors 866 can detect the human body parts proximate to the electronic device, and convey information regarding the detection to processing device(s) 830. In one embodiment, the sensors 866 may be capacitive sensors that are configured to measure capacitance generated by the human body part proximate to the electronic device using any one of various techniques known in the art, for example, relaxation oscillation, a current verses voltage phase shift comparison, resistor-capacitor charge timing, capacitive bridge division, charge transfer, sigma-delta modulation, or charge-accumulation. In an alternative embodiment, the sensors 866 may also be optical (e.g., infrared) sensors that use an emitter and receiver pair to detect the presence of opaque objects. Alternatively, the sensors 866 may be inductive sensors, which include an inductive loop. When the presence of a human body part (or metal object) is brought close to the inductive sensor, an induction of the inductive loop changes, causing the human body part to be detected. Alternatively, the sensors 866 may be ultrasonic sensors that emit an ultrasonic signal and measure a time duration between when a signal is transmitted and the reflection of that signal received (a.k.a., flight response). The sensors 866 may also include other types of sensors, such as those that operate using the detection principles of resistive (e.g., analog resistive, digital resistive or residual resistive), surface acoustic wave, electromagnetic, near field imaging, or other technologies. In one embodiment, multiple different types of sensors are used. It should also be noted that the sensors 866 may be used to determine a distance between one or more of the antennas and the detected human body part. Though the detected object is described herein as a human body part, other types of objects may also be detected depending on the sensing technologies used.

In one embodiment, electronic device 800 includes one or more inertial sensors 899. The inertial sensors 899 can be used to detect motion of the electronic device 800. In one embodiment, the inertial sensors 899 detect linear accelerations (translational movement) and angular accelerations (rotational movement). The inertial sensors 899 may include accelerometers and/or gyroscopes. Gyroscopes use principals of angular momentum to detect changes in orientation (e.g., changes in pitch, roll and twist). Accelerometers measure accelerations along one or more axes (e.g., translational changes). The gyroscope and accelerometer may be separate sensors, or may be combined into a single sensor. The inertial sensors 899 in one embodiment are micro-electromechanical systems (MEMS) sensors.

In one embodiment, the motion data from the one or more inertial sensors 899 may be used to determine an orientation of the electronic device 800 to determine if a communication link criterion is satisfied (e.g., whether the electronic device 800 is in proximity to a user's body). In another embodiment, the sensor data from the one or more sensors 866 may be used to determine an orientation of the electronic device 800 for to determine if a communication link criterion is satisfied. In a further embodiment, of the motion data and the sensor data may be used to determine whether a communication link criterion is satisfied.

The processing device(s) 830 may include sensor circuitry 835 (e.g., sensor device drivers) that enables the processing device(s) 830 to interpret signals received from the sensor(s) 866 and/or inertial sensors 899. In one embodiment, the sensors 866 and/or inertial sensors 899 output fully processed signals to the processing device(s) 830. For example, the sensors 866 may output a distance, a detected/not detected signal, etc. using a single line interface or a multi-line interface. Similarly, inertial sensors 899 may output an acceleration value (e.g., in Gs). In another embodiment, the sensors 866 output, for example, positional data and/or object presence data (e.g., of a human body part) to the processing devices) 830 without first processing the data. Similarly, inertial sensors 899 may output, for example, voltage values that can be interpreted as acceleration values. In either instance, the processing device(s) 830 may use the sensor circuitry 835 to process and/or interpret the received data. If data is received from multiple sensors 866 and/or inertial sensors 899, processing the data may include averaging the data, identifying a maximum from the data, or otherwise combining the data from the multiple sensors. In one embodiment, in which the sensors 866 include a sensor array, numerous sensors, or a touch panel, processing the data includes determining where on the electronic device the human body part is located from multiple sensor readings.

The electronic device 800 may include a device housing 880 that houses the various components described above. Electronic device 800 may also include connector housing 110. The connector housing may be used to connect various external peripheral components to electronic device 800.

The foregoing description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of embodiments of the present invention.

In the above description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the description.

It is to be understood that the above description is intended to be illustrative, and not restrictive. Many other embodiments will be apparent to those of skill in the art upon reading and understanding the above description. The scope of the present invention should, therefore, be determined with reference to the appended claims, along with the full scope of equivalents to which such claims are entitled.

What is claimed is:

1. An electronic device comprising:
   a device housing; and
   a headphone connector housing coupled to an interior surface of the device housing, wherein the headphone connector housing comprises:
      a connector plug socket within the headphone connector housing, the connector plug socket configured to receive a connector plug of a pair of headphones connected to the electronic device, the connector plug socket comprising an interior surface to contact the connector plug;
      a plurality of contacts disposed within the connector plug socket on the interior surface of the connector plug socket, the plurality of contacts to form an electrical connection with the connector plug and pass electric signals from the electronic device to the pair of headphones;
      wherein the headphone connector housing has a mounting hole located through the connector plug socket, perpendicular to the connector plug socket and perpendicular to the interior surface of the device housing to which the headphone connector housing is coupled, the mounting hole configured to allow a screw to pass through the headphone connector housing to secure the headphone connector housing to the device housing; and
      a countersink within the connector plug socket configured to receive the screw, wherein a top surface of the screw is below the interior surface of the connector plug socket when screwed into the countersink to prevent an obstruction of the connector plug by the screw in the connector plug socket.

2. The electronic device of claim 1, further comprising:
   a signal generation component within the device housing, the signal generation component configured to generate the electric signals,
   wherein the wherein the headphone connector housing comprises a plurality of contact leads coupled to the plurality of contacts, the plurality of contact leads to couple the headphone connector housing to the signal generation component.

3. The electronic device of claim 1, wherein the connector plug socket is a substantially cylindrical void around a first central axis, and wherein the mounting hole comprises a first opening in a top side of the connector plug socket and a second opening in the bottom side of the connector plug socket, the second opening adjacent to the countersink, wherein the first opening and the second opening are aligned on a second central axis.

4. The electronic device of claim 3, wherein the second central axis is oriented perpendicular to the first central axis, and wherein the second central axis intersects the first central axis.

5. The electronic device of claim 1, wherein the mounting hole extends through one end of the connector housing that is opposite an end of the connector housing closest to an edge of the device housing.

6. An apparatus comprising:
a connector housing, the connector housing comprising:
an interior socket configured to receive a connector plug; and
wherein the connector housing has a mounting hole through the interior socket, the mounting hole comprising a top opening in a first side of the interior socket and a bottom opening in a second side of the interior socket, the first side opposite the second side, wherein a central axis of the mounting hole is oriented perpendicular to a central axis of the interior socket and wherein the central axis of the mounting hole intersects the central axis of the interior socket, the mounting hole configured to allow a mounting element to pass through the interior socket along the central axis of the mounting hole.

7. The apparatus of claim 6, wherein the interior socket comprises a substantially cylindrical void in the connector housing oriented around the central axis of the interior socket.

8. The apparatus of claim 6, wherein the second opening of the mounting hole comprises a countersink set below a surface of the interior socket.

9. The apparatus of claim 6, wherein the first opening and the second opening are substantially circular and are aligned on the central axis of the mounting hole.

10. The apparatus of claim 8, further comprising:
a mounting surface; and
the mounting element, wherein the countersink to receive the mounting element, the mounting element configured to secure the connector housing to the mounting surface.

11. The apparatus of claim 10, wherein when the mounting element is inserted into the countersink, a top surface of the mounting element resides below the second side of the interior socket to prevent an obstruction of the connector plug by the screw in the interior socket.

12. The apparatus of claim 10, wherein the mounting element comprises an insulating layer on the top surface of the mounting element, the insulating layer to prevent contact between the mounting element and the connector plug.

13. The apparatus of claim 10, wherein the mounting element is aligned with the central axis of the interior socket to reduce a moment of force of the connector housing about the central axis of the interior socket.

14. The apparatus of claim 6, wherein the connector housing further comprises:
a plurality of contacts disposed within the interior socket, the plurality of contacts to form an electrical connection with the connector plug.

15. The apparatus of claim 14, further comprising:
an electrical component coupled to the plurality of contacts, the electrical component configured to transmit a signal to the connector plug via the electrical connection between the plurality of contacts and the connector plug.

16. A method comprising:
inserting an assembly fixture into a connector plug socket in a connector housing, the connector plug socket comprising a plurality of contacts disposed within the connector plug socket, wherein the connector housing has a mounting hole through the connector plug socket, the mounting hole comprising a top opening in a first side of the connector plug socket and a bottom opening in a second side of the connector plug socket, the first side opposite the second side, wherein the mounting hole is perpendicular to a central axis of the connector plug socket; and
passing a mounting element through the mounting hole to secure the connector housing to a device housing of an electronic device, wherein the assembly fixture is configured to protect the plurality of contacts within the connector plug socket.

17. The method of claim 16, wherein the assembly fixture is substantially cylindrical and comprises a through hole oriented perpendicular to a length of the assembly fixture.

18. The method of claim 17, further comprising:
passing the mounting element through the through hole in the assembly fixture; and
attaching the mounting element to the device housing to secure the connector housing in place.

19. The method of claim 16, further comprising:
removing the assembly fixture once the mounting element is attached to the device housing.

20. The method of claim 16, wherein the assembly fixture is configured to protect the plurality of contacts by preventing the mounting element from contacting the plurality of contacts when the mounting element is passed through the mounting hole.

* * * * *